US012754844B2

(12) United States Patent
Mishra et al.

(10) Patent No.: US 12,754,844 B2
(45) Date of Patent: Oct. 6, 2026

(54) OPTIMIZATION OF BROADCAST OPERATIONS IN MULTIPLE CORE PROCESSING SYSTEM WITH A DISTRIBUTED CACHE

(71) Applicant: NXP B.V., Eindhoven (NL)

(72) Inventors: Ayush Mishra, Ghaziabad (IN); Abhishek Jain, Sikandrabad (IN); Arvind Kaushik, Noida (IN); Ayush Garg, New Delhi (IN); Sumit Gangwar, Rampur (IN); Eshant Verma, New Delhi (IN)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 19/190,862

(22) Filed: Apr. 28, 2025

(65) Prior Publication Data

US 2026/0267800 A1 Sep. 10, 2026

(30) Foreign Application Priority Data

Mar. 10, 2025 (IN) ............................. 202541021398

(51) Int. Cl.
*G06F 12/0811* (2016.01)

(52) U.S. Cl.
CPC ................................ *G06F 12/0811* (2013.01)

(58) Field of Classification Search
CPC ................................................... G06F 12/0811
See application file for complete search history.

(56) References Cited

U.S. PATENT DOCUMENTS

| | | | | |
|---|---|---|---|---|
| 10,055,348 | B2 | 8/2018 | Busaba et al. | |
| 10,579,527 | B2 | 3/2020 | Guthrie et al. | |
| 11,513,958 | B1 * | 11/2022 | Mukherjee | G06F 12/0804 |
| 11,604,733 | B1 * | 3/2023 | Krueger | G06F 12/0864 |
| 2004/0068617 | A1 * | 4/2004 | Hardage, Jr. | G06F 12/0855 711/E12.051 |
| 2010/0262778 | A1 * | 10/2010 | Cargnoni | G06F 12/127 711/E12.017 |
| 2018/0276143 | A1 * | 9/2018 | Little | G06F 12/0811 |
| 2020/0134043 | A1 * | 4/2020 | Demoor | G06F 16/122 |
| 2023/0066662 | A1 * | 3/2023 | Park | G06F 9/321 |
| 2023/0305966 | A1 * | 9/2023 | Kohl | G06F 12/0895 |

* cited by examiner

*Primary Examiner* — Edward J Dudek, Jr.

(57) ABSTRACT

A multiple core processing system as described herein for optimizing broadcast operations includes multiple first-level (L1) caches, a distributed second-level (L2) cache system including multiple L2 cache partitions each having a unique identifier, and a routing network that enable communications between the L1 and L2 caches. Each L1 cache sends a request message with a memory address to a targeted L2 cache partition. When rejected, the L1 cache resends the request only in response to a retry message that incorporates an identifier that matches a locally stored identifier. Each L2 cache partition sends a reject message to a requesting Li cache when busy and later broadcasts a retry message that incorporates its identifier when not busy. The L1 cache predetermines the identifier of the target L2 cache partition when sending the request, or each L2 cache partition incorporates its identifier in the reject message.

20 Claims, 10 Drawing Sheets

*FIG. 10*

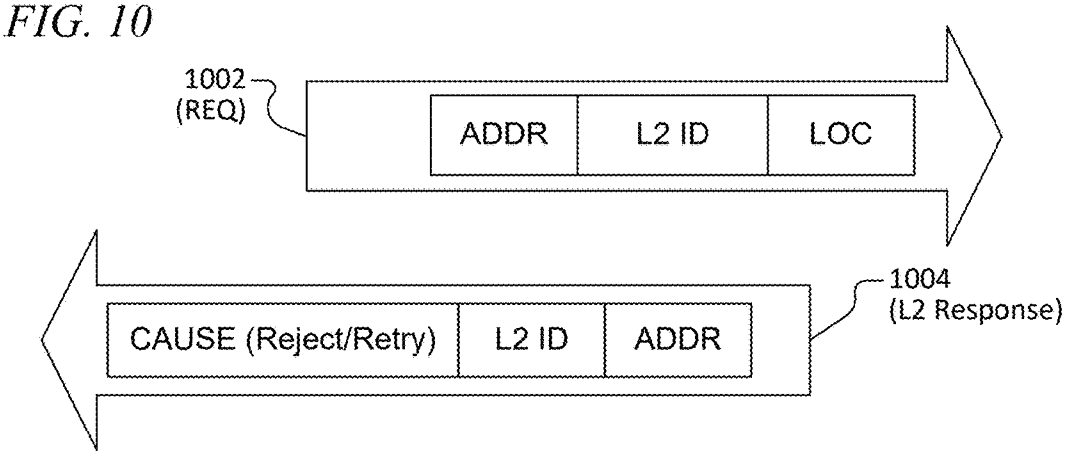

1102

| Cause of Reject | Cause of Retry | | | |
|---|---|---|---|---|
| | Coherency Manager Full | Coherency Manager Pending | Miss Manager Full | Miss Manager Pending |
| Coherency Manager Full | Resend Request Message based on L2ID | Resend Request Message based on L2ID | Request Message not Resent | Request Message not Resent |
| Coherency Manager Pending | Request Message not Resent | Resend Request Message based on L2ID and ADDR | Request Message not Resent | Request Message not Resent |
| Miss Manager Pending | Request Message not Resent | Request Message not Resent | Resend Request Message based on L2ID | Resend Request Message based on L2ID |
| Miss Manager Full | Request Message not Resent | Request Message not Resent | Request Message not Resent | Resend Request Message based on L2ID and ADDR |

*FIG. 11*

OPTIMIZATION OF BROADCAST OPERATIONS IN MULTIPLE CORE PROCESSING SYSTEM WITH A DISTRIBUTED CACHE

CROSS-REFERENCE TO RELATED APPLICATIONS

This application claims the priority under 35 U.S.C. § 119 of India Patent application no. 202541021398, filed on 10 Mar. 2025, the contents of which are incorporated by reference herein.

BACKGROUND

Field

The present disclosure relates in general to multiple core (multicore) processing systems, and more particularly to optimization of broadcast operations in a multicore processing system with a distributed cache.

Description of the Related Art

In a multicore cache coherent system, a significant issue is managing traffic especially while handling broadcast operations. In the case of a broadcasted retry message from a second-level (L2) cache partition of a distributed L2 cache, for example, each first-level (L1) cache of corresponding processing cores in the multiple core processing system that has had an L2 request rejected indiscriminately resend their request in response to the retry message resulting in a heavy level of traffic on a routing network interfacing the cores and caches. A substantial amount of traffic is generated since many of the request messages are sent again without success and directed to other L2 cache partitions that did not broadcast the retry message.

BRIEF DESCRIPTION OF THE DRAWINGS

Embodiments of the present invention are illustrated by way of example and are not limited by the accompanying figures. Similar references in the figures may indicate similar elements. Elements in the figures are illustrated for simplicity and clarity and have not necessarily been drawn to scale.

FIG. 10 is a figurative block diagram illustrating information incorporated within a request message from the L1 cache and a response message from a target L2 cache partition according to one embodiment.

FIG. 11 is a table listing the information stored in the CAUSE field of the response message for both reject and retry messages, and the corresponding response by the L1 cache according to one embodiment.

DETAILED DESCRIPTION

In a multicore processing system with a distributed cache system, each of multiple second-level (L2) cache partitions are assigned a unique L2 identifier (L2ID). Each core has a corresponding first-level (L1) cache that is configured to send request messages to the L2 cache for data associated with a memory address. Each request message is routed to the target L2 cache partition, and each L2 cache partition is configured to reject L1 cache requests when busy. Each L1 cache sending a request locally stores the L2ID of the target L2, either when sending the request message, if known, or when receiving a reject message from the target L2 cache partition incorporating a corresponding L2ID. In one embodiment, each L1 cache is configured to first determine and locally store the L2ID based on the memory address before sending the request. In another embodiment, each L2 cache partition also incorporates its L2ID in the reject message, which is then locally stored by the requesting L1 cache when received. When next available, each L2 cache partition that has rejected at least one request broadcasts a retry message that incorporates its L2ID, such as within an RDATA field of the retry message.

Each rejected L1 cache receiving the broadcasted retry message compares the locally stored L2ID with the L2ID incorporated within the retry message. If the locally stored L2ID matches the received L2ID, then the retry message is intended for that L1 cache so that it resends the request message. If the stored L2ID does not match the received L2ID, then the L1 cache ignores the retry message. As a result, unnecessary requests from L1 caches are avoided and the traffic on the routing network is substantially reduced.

Figure 1:
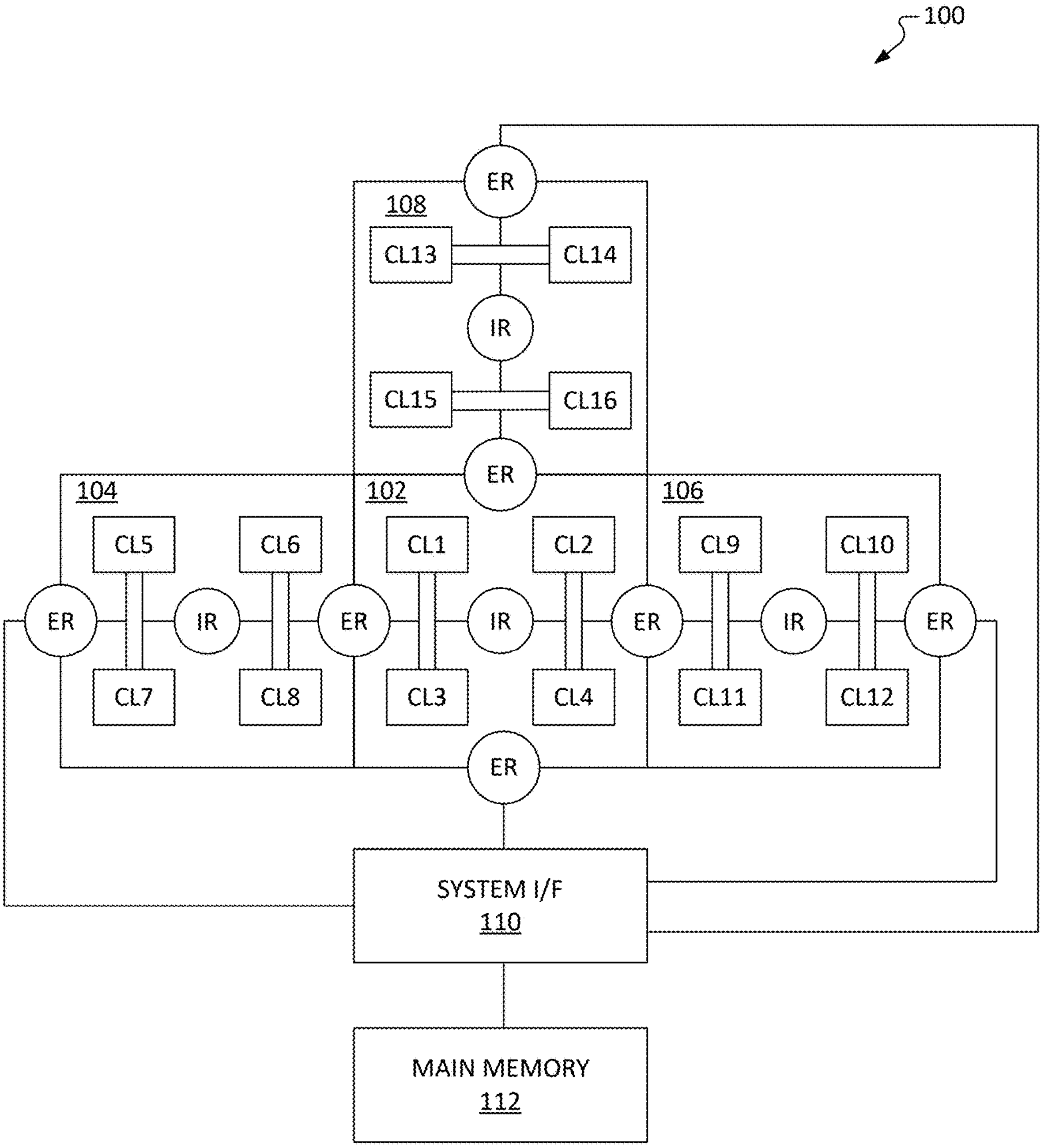
FIG. 1 is a simplified block diagram of a multiple core (multicore) processing system with a distributed cache system implemented according to one embodiment for optimizing broadcast operations.

FIG. 1 is a simplified block diagram of a multiple core (multicore) processing system 100 with a distributed cache system implemented according to one embodiment for optimizing traffic. The illustrated multicore processing system 100 includes four meta-tiles 102, 104, 106, and 108 (102-108) communicatively coupled by a routing network 404 (FIG. 4) to each other and to a main memory 112 via at least one system interface (I/F) 110. Although a single centralized system interface 110 is shown, each meta-tile 102-108 may include a separate system interface. As described further herein, the routing network 404 includes multiple external routers (ERs), multiple internal routers (IRs), and corresponding interconnects illustrated as lines between the ERs and IRs. Each of the routers including IRs and ERs may be configured in any suitable manner, such as mesh routers or the like or any other suitable communication device for routing communications of the multicore processing system 100. Other portions of the multicore processing system 100 may be included but are not shown such as, for example, a third-level cache (L3) along with other system components and devices. The four illustrated meta-tiles 102-108 along with the system interface 110 forms a quartile. The multicore processing system 100 is scalable in that one or more meta-tiles may be included for a system with a single quartile and multiple quartiles may be included for larger scaled systems. For example, the multicore processing system 100 may be scaled down to include only one meta-tile (e.g., meta-tile 102), two meta-tiles (e.g., 102 and 104), or three meta-tiles (e.g., 102, 104, and 106).

Each of the meta-tiles 102-108 includes multiple core clusters communicatively interfaced by a corresponding IR. As shown, for example, meta-tile 102 includes four core clusters CL1, CL2, CL3, and CL4 communicatively coupled via a first IR, meta-tile 104 includes another four core clusters CL5, CL6, CL7, and CL8 communicatively coupled via a second IR, meta-tile 106 includes four core clusters CL9, CL10, CL11, and CL12 communicatively coupled via a third IR, and meta-tile 108 includes four core clusters CL13, CL14, CL15, and CL16 communicatively coupled via a fourth IR. Each cluster includes multiple processing cores as further described herein, such as, for example, four cores per cluster. Each of the ERs of the routing network 404 enables external communication between a corresponding meta-tile with other meta-tiles and with system components and devices via the system interface 110 (which may be centralized or distributed).

Figure 2:
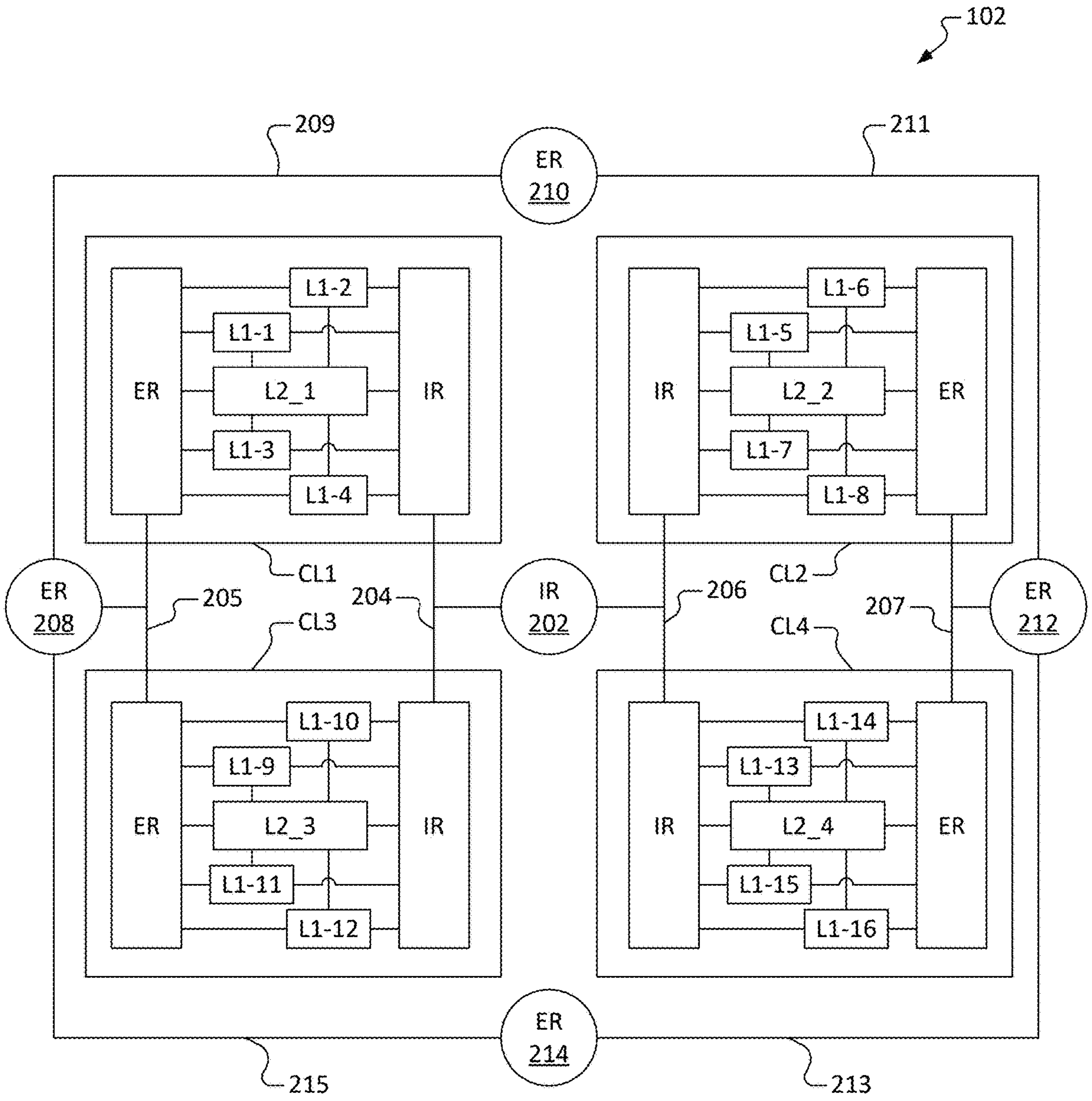
FIG. 2 is a simplified block diagram of the meta-tile of FIG. 1 implemented according to one embodiment including the four core clusters CL1, CL2, CL3, and CL4 (CL1-CL4) communicatively coupled via a corresponding internal router.
Figure 4:
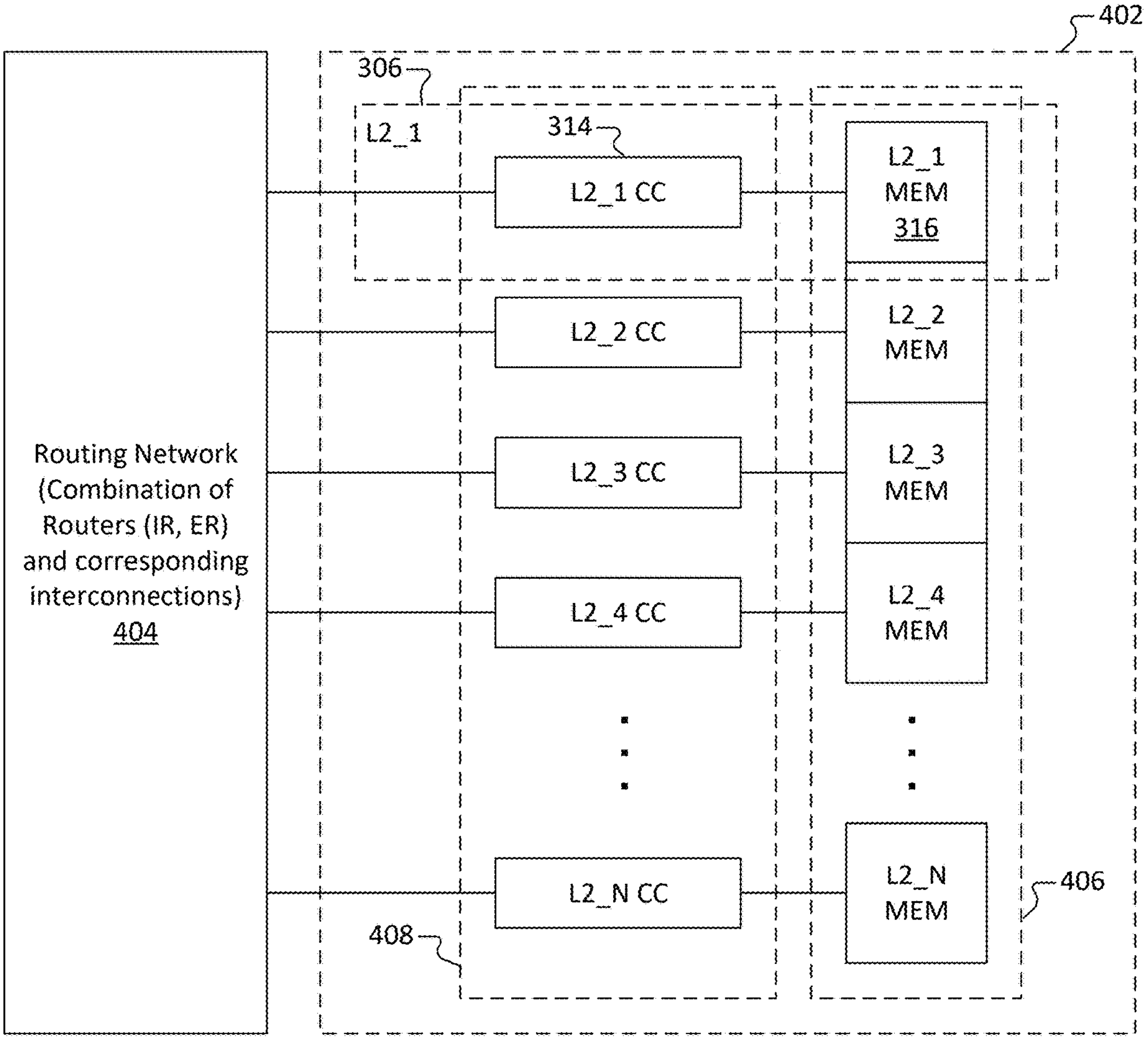
FIG. 4 is a simplified block diagram of an L2 cache system coupled to a routing network implemented according to one embodiment.

FIG. 2 is a simplified block diagram of the meta-tile 102 implemented according to one embodiment including the four core clusters CL1, CL2, CL3, and CL4 (CL1-CL4) communicatively coupled via a corresponding internal router (IR) 202. Each of the core clusters CL1-CL4 includes multiple level-one (L1) caches and a corresponding one of multiple L2 cache partitions of an L2 cache system 402 (FIG. 4). As shown, CL1 includes four L1 caches L1-1, L1-2, L1-3, and L1-4 coupled to a first L2 cache partition L2_1, CL2 includes four L1 caches L1-5, L1-6, L1-7, and L1-8 coupled to a second L2 cache partition L2_2, CL3 includes four L1 caches L1-9, L1-10, L1-11, and L1-12 coupled to a third L2 cache partition L2_3, and CL4 includes four L1 caches L1-13, L1-14, L1-15, and L1-16 coupled to a fourth L2 cache partition L2_4.

Each of the core clusters CL1-CL4 includes a local internal router (IR) coupled to the meta-tile IR 202 via corresponding interconnections 204 and 206 to enable communication between the core clusters CL1-CL4. In addition, the L2 cache partition and each of the L1 caches of each cluster is communicatively coupled to the corresponding local IR. Each of the core clusters CL1-CL4 includes a local external router (ER) coupled to at least one of multiple ERs 208, 210, 212, and 214 for enabling external communications. As shown, for example, the local ERs of clusters CL1 and CL3 are communicatively coupled to the external ER 208 via interconnections 205 and the local ERs of clusters CL2 and CL4 are communicatively coupled to the external ER 212 via interconnections 207. Also, the L2 cache partition and each of the L1 caches of each cluster is communicatively coupled to the corresponding local ER. The ERs 208, 210, 212, and 214 are coupled together via interconnections 209, 211, 213, and 215 to enable external communications with other meta-tiles and with other system components via the system interface 110. Each of the other meta-tiles 104-108 may be configured in a similar manner.

Figure 3:
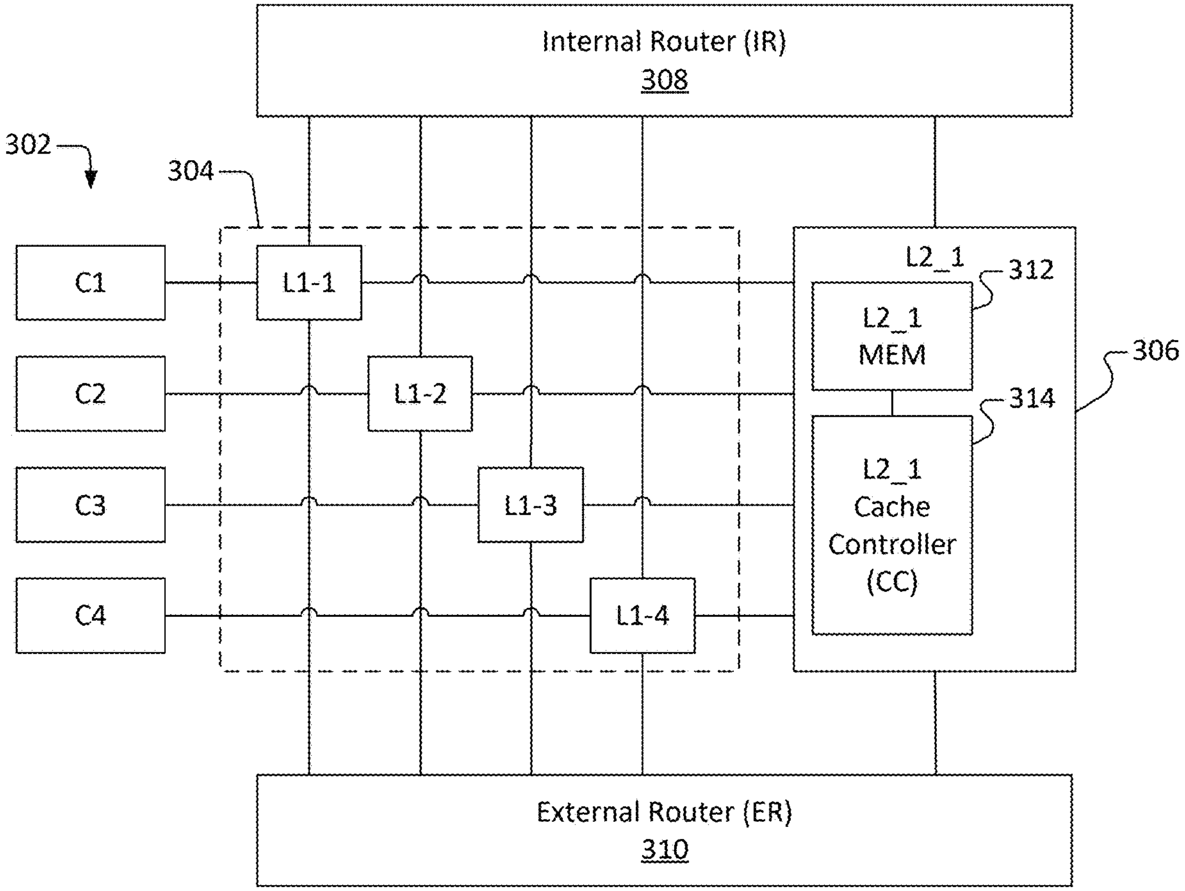
FIG. 3 is a simplified block diagram illustrating further details of the core cluster CL1 of FIG. 2 implemented according to one embodiment.

FIG. 3 is a simplified block diagram illustrating further details of the core cluster CL1 implemented according to one embodiment. The core cluster CL1 includes multiple cores 302, multiple L1 caches 304, an L2 cache partition 306 with a corresponding L2 identifier (L2ID) L2_1, a local IR 308, and a local ER 310. In one embodiment as illustrated, the core cluster CL1 includes four cores 302 individually labeled C1, C2, C3, and C4, each coupled to a corresponding one of four L1 caches 304 individually labeled L1-1, L1-2, L1-3, and L1-4, respectively. The L1 caches 304 are each coupled to the L2 cache partition 306, and the L1 caches 304 and the L2 cache partition 306 are each further coupled to the local IR 308 and to the local ER 310. The L2 cache partition 306 includes a memory 312 (L2_1 MEM) coupled to an L2 cache controller (CC) (L2_1 CC). Each of the other core clusters CL2-CL16 and any other cores in the multicore processing system 100 may be configured in substantially similar manner. Although not specifically shown, it is appreciated that the quartile of the multicore processing system 100 shown in FIG. 1 includes 64 processing cores (e.g., C1, C2, C3, . . . , C64) and 64 corresponding L1 caches (e.g., L1-1, L1-2, L1-3, . . . , L1-64).

FIG. 4 is a simplified block diagram of the L2 cache system 402 coupled to the routing network 404 implemented according to one embodiment. The routing network 404 is a combination of the IRs and ERs and corresponding interconnections. The L2 cache system 402 includes an L2 cache memory 406 and an L2 cache controller 408. The L2 cache memory 406 and the L2 cache controller 408 are both subdivided into corresponding L2 cache partitions. As shown, the L2 cache memory 406 is subdivided into N L2 memory partitions L2_1 MEM, L2_2 MEM, L2_3 MEM, L2_4 MEM, . . . , L2_N MEM collectively forming a larger contiguous memory of the L2 cache memory 406. Similarly, the L2 cache controller 408 is subdivided into a corresponding N separate L2 cache controllers L2_1 CC, L2_2 CC, L2_3 CC, L2_4, CC, . . . , L2_N CC, in which each of the N separate L2 cache controllers is provided to control a corresponding one of the N L2 memory partitions L2_1 MEM-L2_N MEM. In this manner, each of the N L2 memory partitions L2_1 MEM-L2_N MEM and a corresponding one of the N L2 cache controllers L2_1 CC-L2_N CC forms a corresponding one of N L2 cache partitions.

Each of the N L2 cache partitions may be identified by a corresponding L2 identifier (L2ID)=L2_j, in which "j" is an index from 1 to N. As shown, for example, L2_1 MEM 312 and L2_1 CC 314 collectively form the first L2 cache partition 306 having an L2ID=L2_1. In this manner there are N L2 cache partitions with corresponding unique IDs L2_1, L2_2, . . . , L2_N in the multicore processing system 100. As previously described, the multicore processing system 100 is scalable so that the size of the L2 cache memory and the corresponding number of L2 cache controllers is scaled based on the number N (and thus decreases or increases depending upon the value of N).

Figure 5:
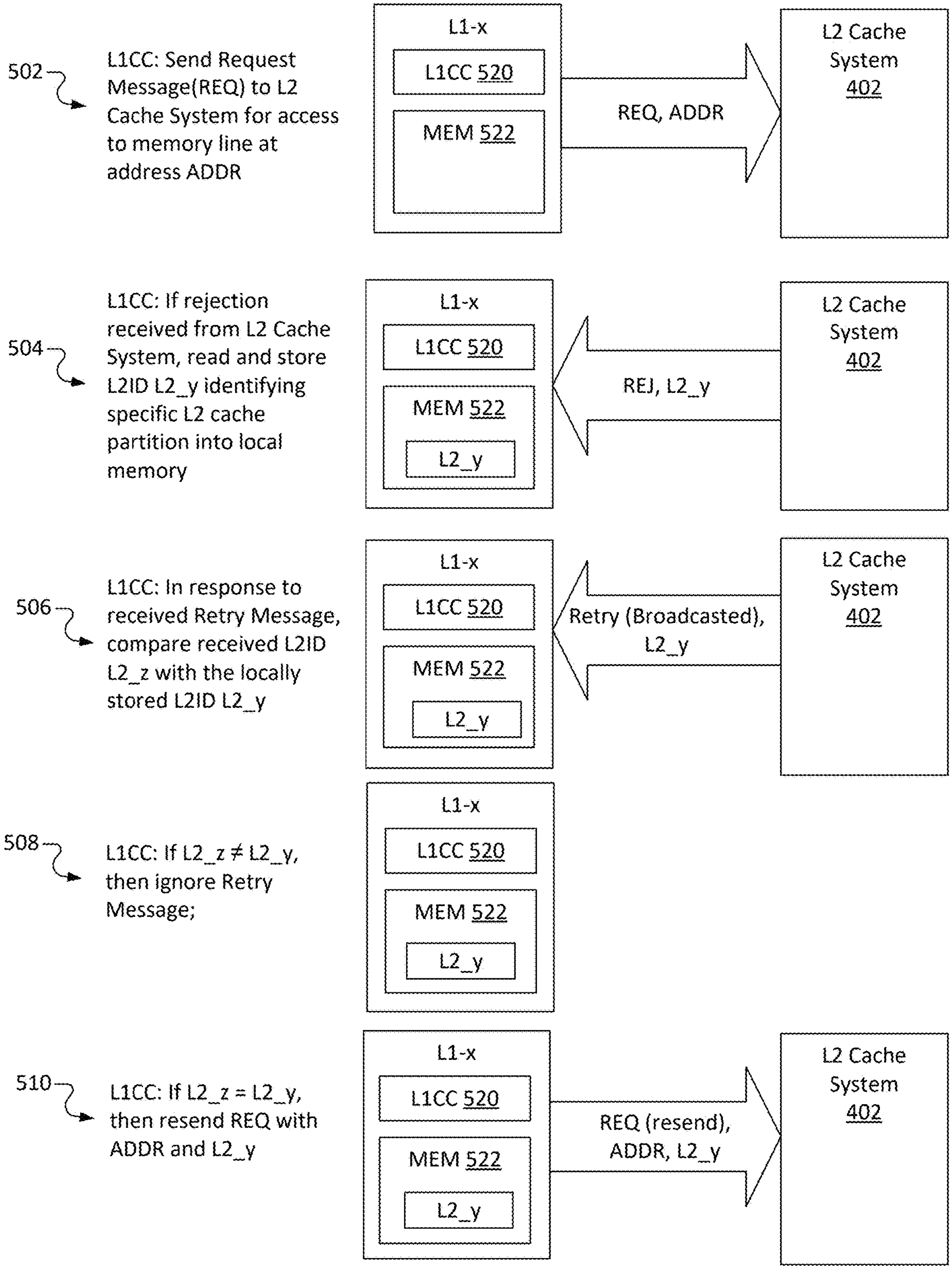
FIG. 5 is a figurative diagram showing a series of transactions between a selected local L1 cache, shown as L1-x (in which "x" denotes an index identifying a selected one of the L1 caches), and the L2 cache system of FIG. 4 according to one embodiment.

FIG. 5 is a figurative diagram showing a series of transactions between a selected local L1 cache, shown as L1-x (in which "x" denotes an index identifying a selected one of the L1 caches), and the L2 cache system 402 according to one embodiment. As shown in FIG. 2 and also in FIG. 3, each L1 cache interfaces a local L2 cache partition (e.g., the L2 cache partition 306 with L2ID L2_1) which is a corresponding one of the N L2 cache partitions, but also interfaces a local IR for communication within a corresponding local cluster and further interfaces a local ER for communication outside the cluster, such as to other meta-tiles. In one embodiment, if the L1 cache has resolved or is otherwise configured to resolve the relative location or identity of the target L2 cache partition, it selects the appropriate communication interface for transmitting a request, such as the local L2 cache partition, the local IR, or the local ER. In another embodiment in which the L2 cache has not resolved the location of the target L2 cache partition, it may submit the request to its local L2 cache partition, which resolves and forwards the request to other L2 cache partitions via the routing network 404. Each L1 cache as illustrated by L1-x includes a local L1 cache controller (L1CC) 520 and a local memory (MEM) 522. The local memory MEM 522 includes the L1 cache memory along with any other type of memory, such as additional memory devices or registers or the like, for storing supporting information.

In a first transaction 502, L1-x sends a request message (REQ) to the L2 cache system 402 for a memory line identified by an address ADDR incorporated within the request message. In one embodiment, ADDR is a "physical" address to a corresponding memory line within the main memory 112, which is (or which eventually will be) copied into a corresponding L2 cache line within the L2 cache memory 406 and ultimately provided to the requesting L1 cache L1-x. In one embodiment, a portion of each ADDR is used as a set index that identifies only one L2 cache line located within a corresponding one of the N L2 memory partitions. It is appreciated that the L2 cache memory 406, even when scaled upwards, is smaller than the main memory 112 such that two or more different physical addresses of the main memory 112 may have the same set index that maps to the same L2 cache line. In one embodiment, the L2 cache memory 406 may be configured as a set-associative cache structure with multiple "ways" such that each L2 set may include multiple ways for storing data for multiple physical addresses having the same set index. In the embodiment illustrated in FIG. 5, L1-x is not configured to determine beforehand which particular L2 memory partition holds the data for address ADDR but simply provides ADDR to its local L2 cache partition or to its local L2 partition router.

In a next transaction 504, the request has been routed to the particular L2 cache partition that holds the data for address ADDR, which has a corresponding unique L2ID=L2_y (in which "y" is a number from 1 to N identifying one of the N L2 cache partitions). In the transaction 504, the L2 cache partition L2_y determines that it is busy and cannot immediately respond to the request. Thus, the L2 cache partition L2_y responds with a reject message (REJ) that incorporates a copy of the corresponding L2ID=L2_y, which is routed back to the requesting L1 cache L1-x. It is noted that reject messages are transmitted directly to the requesting L1 cache. The L1CC 520 of the L1-x retrieves the L2ID L2_y from the reject message and stores L2_y into its local memory 522.

In a next transaction 506, the L1-x receives a broadcasted retry message incorporating an L2ID shown as L2_z in which "z" is also a number from 1 to N identifying one of the N L2 cache partitions. Note that since one or more of the L2 cache partitions may receive multiple requests over time while it is busy, each L2 cache partition does not attempt to target retry messages to specific L1 caches but instead broadcasts at least one retry message. It is appreciated that other L1 caches may be resend requests to other L2 cache partitions so that L1-x may receive multiple retry messages that are broadcasted over time while the L2 cache partition L2_y remains busy. The L1 cache L1-x retrieves the L2ID L2_z from the received retry message and compares with its locally stored L2ID L2_y to which it originally sent its request.

As shown by a transaction 508, the L1 cache L1-x has determined that L2_z is not equal to L2_y (or L2_x #L2_y), so that the broadcasted retry message is intended for another L1 cache. In this case, the L1 cache L1-x ignores the retry message. It is appreciated that this same behavior is followed by each L1 cache in the multicore processing system 100 thereby reducing the heavy traffic as compared to conventional configurations. In conventional configurations, for example, multiple ones up to all of the L1 caches (and the corresponding cores) send their requests again in response to every retry message irrespective of whether the retry was broadcasted from the L2 cache partition that rejected the local requests resulting in a substantial amount of unnecessary traffic. Instead, in the multicore processing system 100, each L1 cache (or its corresponding core) responds to retry messages only from the L2 cache partition that rejected its request. As a result, higher performance is achieved by substantially reducing traffic through the routing network.

Eventually the L2 cache partition L2_y becomes free and broadcasts a retry message along with its L2ID L2_y. As shown by a transaction 510, the L1 cache L1-x has determined that L2_z is equal to L2_y (or L2_x=L2_y), so that the retry message indicates that L2_y is available to receive the request. Thus, L1-x resends its request message along with the corresponding address ADDR and, since known, the L2ID: L2_y. In this manner, the request is sent again when the targeted L2 cache partition has indicated that it is available to receive and process the request.

Figure 6:
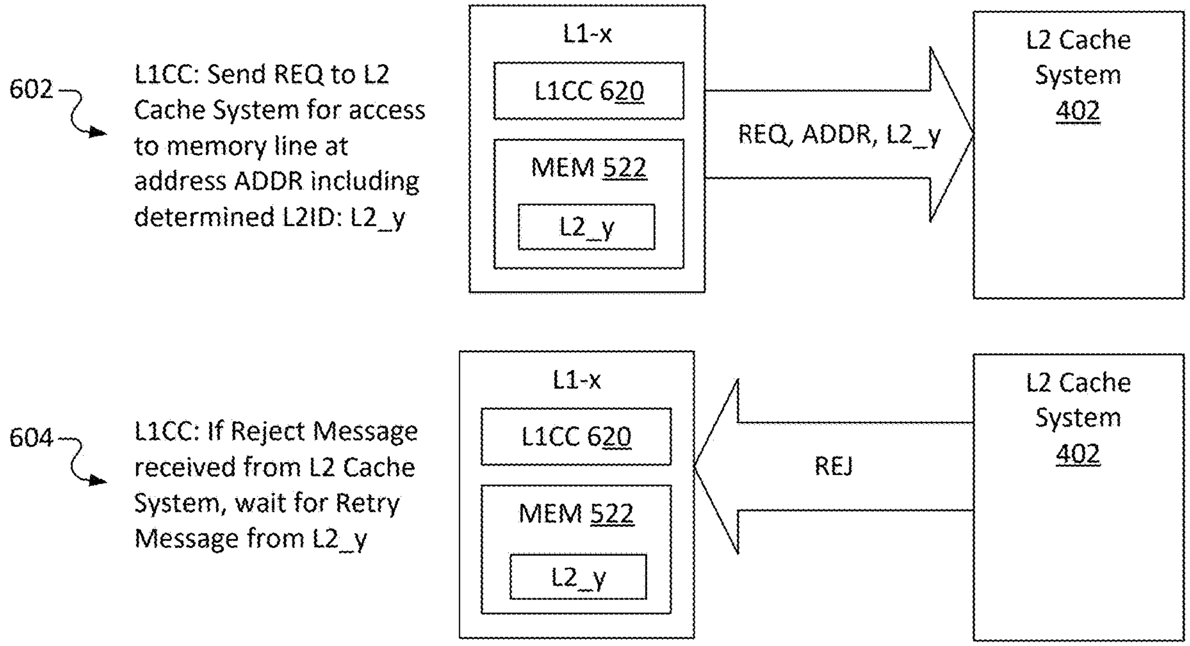
FIG. 6 is a figurative diagram showing a portion of the transactions between the selected local L1 cache L1-x and the L2 cache system of FIG. 4 according to another embodiment.

FIG. 6 is a figurative diagram showing a portion of the transactions between the selected local L1 cache L1-x and the L2 cache system 402 according to another embodiment. FIG. 6 only shows transactions 602 and 604 which replace the corresponding transactions 502 and 504, respectively, in which the remaining transactions 506, 508, and 510 may be included but are not shown in FIG. 6. In this case, the L1-x cache includes an L1 cache controller L1CC 620 that replaces L1CC 520, in which the L1CC 620 is configured to use ADDR to resolve the L2ID L2_y of the target L2 cache partition before sending the initial request. The L1 cache L1-x locally stores L2_y and sends the initial request in transaction 602 including ADDR and L2_y to the target L2 cache partition L2_y via the routing network 404 and the L2 cache system 402. In this case, the routing network 404 may use the included L2ID L2_y to route the request to the targeted L2 cache partition L2_y.

The next transaction from the local L2 cache partition of the L2 cache system 402 may be the same as the transaction 504, in which it responds with the rejection including the L2ID L2_y as before. In that case, the L1CC 620 of the L1 cache L1-x may use the received ID L2_y to compare with its locally stored L2ID for confirmation. Alternatively, as shown by the transaction 604, the rejection from the L2 cache system 402 omits the L2ID L2_y although it may include other information (not shown). FIG. 6 illustrates that several variations are possible without departing from the spirit and scope of the disclosure.

In the same manner as shown and described in FIG. 5, eventually the L2 cache partition L2_y becomes free and broadcasts a retry message along with its L2ID L2_y. Also as shown by transaction 510, the L1 cache L1-x has determined that L2_z is equal to L2_y (or L2_x=L2_y), so that the broadcasted retry message indicates that L2_y is available to receive the request. Thus, L1-x resends its request message along with the corresponding address ADDR and the L2ID L2_y in the same manner as shown by the transaction 510. In this manner, the request is sent again when the targeted L2 cache partition has indicated that it is available to receive and process the request.

Figure 7:
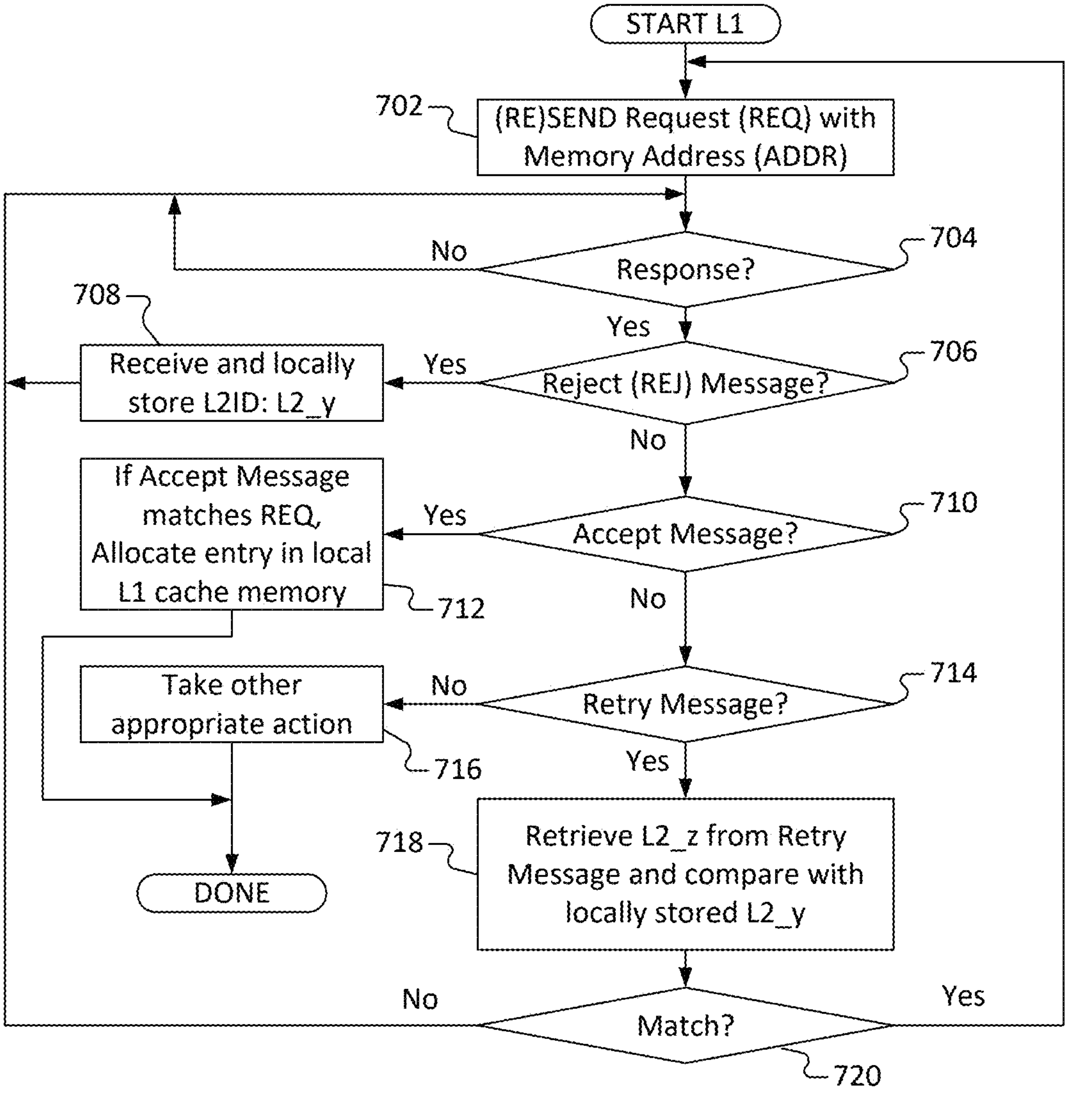
FIG. 7 is a simplified flowchart diagram illustrating operation of the L1 cache controller of each L1 cache (or the corresponding core) when sending or resending a request message according to one embodiment.

FIG. 7 is a simplified flowchart diagram illustrating operation of the L1 cache controller 314 of each L1 cache (or the corresponding core) when sending or resending a request message according to one embodiment. At a first block 702, the L1 cache sends a request message along with the memory address ADDR. In this case, the L1 cache may not yet know the L2ID of the target L2 cache partition since it may not include logic or circuitry used to resolve the L2ID using the ADDR in this first embodiment. At next block 704, the requesting L1 cache waits for a response, and operation loops at block 704 until a response is received.

Operation advances to block 706 when a response is received, in which it is queried whether the received response is a reject message. If so, operation advances to block 708 in which the L2ID: L2_y is retrieved from the reject message and locally stored (e.g., within the local memory 522). Then operation loops back to block 704 to wait for a subsequent response.

If the received response (initial response or subsequent response received at block 704) is not a reject message as determined at block 706, then operation instead advances to block 710 in which it is queried whether the received response is an accept message. If the response is an accept message, meaning that the target L2 cache partition was not busy and has responded favorably to the request with the corresponding memory address ADDR and the requested data, then operation advances to block 712. At block 712, the L1 cache may first determine whether the accept message matches the request message, such as whether the ADDR referenced in the accept message matches the ADDR of the request message. If so, then the L1 cache allocates an entry within its local L1 cache memory to store the retrieved data, and operation is completed. It is noted that if the ADDR does not match, alternative operations may commence which are not further described.

If the response message (initial or subsequent at block 704) is not a reject message or an accept message, then operation advances from block 710 to block 714 to query whether the received response is a retry message, such as broadcasted by an L2 cache partition (such as either the target L2 cache partition or other L2 cache partitions). If not a retry message, then operation advances to block 716 representing any other appropriate action that may be taken, which is not further described, and operation is completed.

If the received response is a retry message as determined at block 714, then operation advances to block 718 in which the L2ID is retrieved from the retry message, shown as L2_z, which is compared with the locally stored L2ID, L2_y, to determine whether they match. At next block 720, it is queried whether they match (i.e., whether L2_z=L2_y). If the received L2ID does not match the locally stored L2ID, then operation loops back to block 704 to wait for a subsequent response. If instead the received and stored L2IDs match as determined at block 720, then operation loops back to block 702 in which the L1 cache resends (the request message with ADDR. Eventually, the response from the target L2 cache partition is an accept message in which an entry is allocated into the local L1 cache as shown at block 712.

Figure 8:
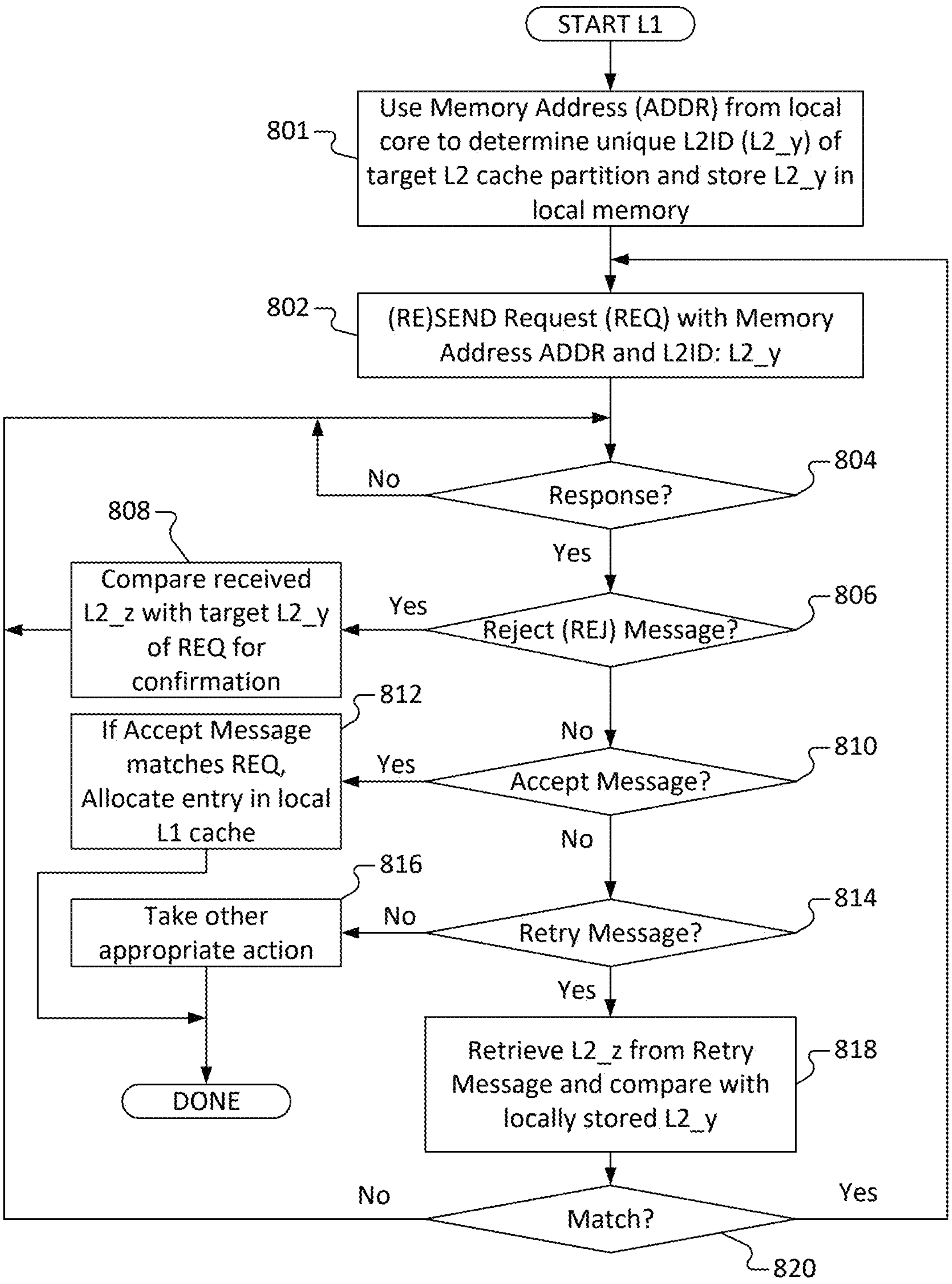
FIG. 8 is a simplified flowchart diagram illustrating operation of the L1 cache controller of each L1 cache (or the corresponding core) when sending or resending a request message according to another embodiment.
Figure 9:
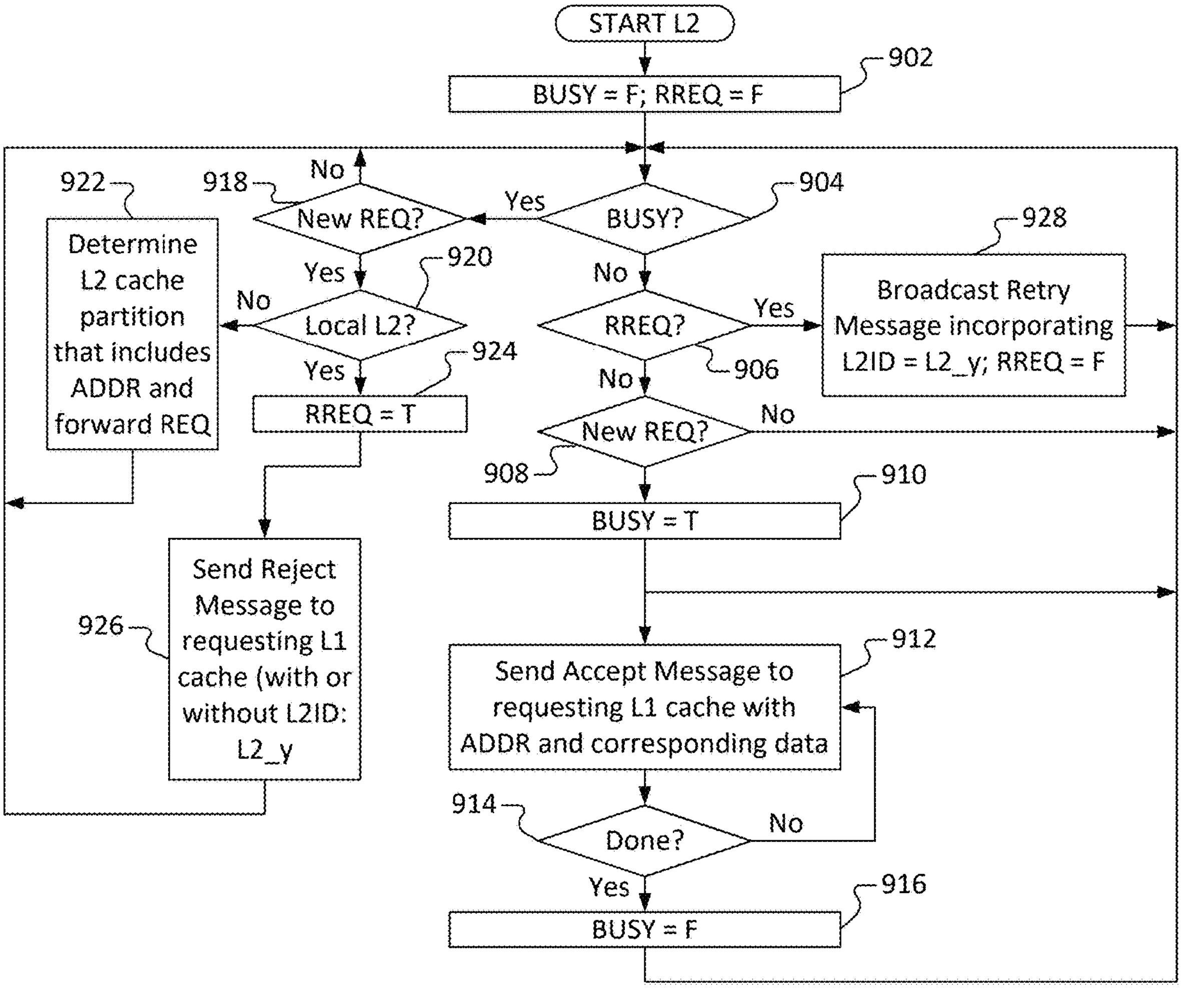
FIG. 9 is a simplified flowchart diagram illustrating operation of the L2 cache controller of each L2 cache partition receiving and responding to request messages according to one embodiment.

FIG. 8 is a simplified flowchart diagram illustrating operation of the L1 cache controller 314 of each L1 cache (or the corresponding core) when sending or resending a request message according to another embodiment. The embodiment of FIG. 9 is similar to that of FIG. 8 except that each L1 cache controller determines and provides the target L2ID with the initial request. At a first block 801, the L1 cache uses the memory address ADDR from the local core to determine the unique L2ID of the target L2 cache partition, such as, for example, L2_y, and locally stores the L2ID in its local memory 522. At next block 802, the L1 cache sends a request (REQ) message along with the memory address ADDR and the L2ID, which in this case is L2_y. At next block 804, the requesting L1 cache waits for a response, and operation loops at block 804 until a response is received.

Operation advances to block 806 when a response is received, in which it is queried whether the received response is a reject message. If the response is a reject message, operation advances to block 808 in which the L1 cache compares the received L2_z with the locally stored L2_y of the initial request for confirmation. If the reject message does not match the initial request message, then other procedures may be performed which are not further described, and operation then loops back to block 804 to wait for a subsequent response.

If the received response (initial response or subsequent response) is not a reject message, then operation advances to block 810 in which it is queried whether the received response is an accept message. If the response is an accept message, meaning that the target L2 cache partition was not busy and has responded favorably to the request with the requested data, then operation advances to block 812. At block 812, the L1 cache may first determine whether the accept message matches the request message, such as whether the ADDR referenced in the accept message matches the ADDR of the request message. If so, then the L1 cache allocates an entry within its local L1 cache memory to store the retrieved data, and operation is completed. It is noted that if the ADDR does not match, alternative operations may commence which are not further described.

If the response (initial or subsequent) is not a reject or an accept message, then operation advances to block 814 to query whether the received response is a retry message, such as broadcasted by the target L2 cache partition or other L2 cache partitions. If not, then operation advances to block 816 representing any other appropriate action that may be taken, which is not further described, and operation is completed.

If the received response is a retry message as determined at block 814, then operation advances to block 818 in which the L2ID is retrieved from the retry message, shown as L2_z, which is compared with the locally stored L2ID, L2_y, to determine whether they match. At next block 820, it is queried whether they match (i.e., whether L2_z=L2_y). If the received L2ID does not match the locally stored L2ID, then operation loops back to block 804 to wait for a subsequent response. If instead the L2ID's match as determined at block 820, then operation loops back to block 802 in which the L1 cache resends the REQ with ADDR and L2_y. Eventually, the response from the target L2 cache partition is an accept message in which an entry is allocated into the local L1 cache as shown at block 812.

FIG. 9 is a simplified flowchart diagram illustrating operation of the L2 cache controller of each L2 cache partition receiving and responding to request messages according to one embodiment. At a first block 902, an initialization process is performed in which a BUSY value and a previously received request (RREQ) value are both set equal to false (F). The BUSY value indicates whether the L2 cache controller is busy handling at least one other request such that it is unable to handle any new requests. The RREQ value indicates whether one or more request messages are received while the L2 cache partition is busy such that it is unable to handle the request messages. Operation advances to block 904 in which it is queried whether the BUSY value it true (T). At least in a first iteration after startup or reset, BUSY is false so that operation advances to block 906 in which it is queried whether RREQ is true (meaning at least one request has been previously received and rejected). In the first iteration RREQ is initially false so that operation advances to block 908 in which it is queried whether a new request message (REQ) is received. If not, operation loops back to block 904. Operation may loop between blocks 904, 906, and 908 until a request message is received.

When a new request message is received as determined at block 908, operation advances to block 910 in which the BUSY value is set to true and operation advances to each of multiple branches denoting simultaneous operation. In a first branch, operation loops back to block 904 after BUSY has been set true, described further below. In a second branch, operation also advances to block 912 in which the target L2 cache partition sends an accept message to the requesting L1 cache. The accept message includes ADDR and the corresponding data stored at ADDR. Although not shown, the target L2 cache partition may also send its own L2ID, which in this case is L2_y. With reference back to blocks 710 and 712 of FIG. 7 and blocks 810 and 812 of FIG. 8, the requesting L1 cache eventually receives the accept message and allocates an entry into its local L1 cache memory (assuming the accept message matches the request message). Meanwhile, while the L2 cache partition is processing the accept message and while BUSY remains true, operation also loops between blocks 912 and 914 until the accept operation is completed. When the accept operation is completed, operation advances to block 916 in which the BUSY value is set back to false, and then operation loops back to block 904.

With reference back to block 910, while the L2 cache partition is busy processing the accept message, operation loops back to block 904 while BUSY is true. In this case, since the L2 cache partition is busy (such as handling the accept message), operation advances to block 918 in which it is queried whether a new request is received. If not, operation loops back to block 904 so long as no new requests are received while the L2 cache partition is busy. If a new request message is received while the L2 cache partition is busy, operation advances to block 920 in which it is queried whether the request is to this (e.g., local) L2 cache partition. In one embodiment in which the request message does not include the target L2ID, the L2 cache partition retrieves ADDR from the request message and determines whether it is to a memory address that is locally stored or to another L2 cache partition. In this embodiment, each of the local L2 cache controllers of the overall L2 cache controller 408 is configured to resolve the target ADDR and determine which L2 cache partition handles that memory address. In another embodiment, the request message does include the L2ID which is retrieved and examined to determine whether the request is local or to another L2 cache partition. If the request message is not targeting the local L2 cache partition, operation advances to block 922 in which the local L2 cache partition forwards the request message to the target L2 cache partition. Once forwarded, operation loops back to block 904.

Eventually, the target L2 cache partition receives the request message. In that case for the target L2 cache partition, operation advances from block 920 to block 924 in which the RREQ value is set to true, and then to block 926 in which the target L2 cache partition sends a reject message to the requesting L1 cache. The reject message may or may not include its own L2ID L2_y. It is noted that in one embodiment (such as shown in FIG. 7), the requesting L1 cache does not first resolve the L2ID of the target L2 cache partition, so that the reject message may be the first time that it receives the L2ID from the target L2 cache partition, which corresponds with blocks 706 and 708 previously described. In another embodiment in which the request message does include the target L2ID (such as shown in FIG. 8), then the reject message may omit the L2ID (since already known by the requesting L1 cache). After sending the reject message at block 926, the target L2 cache partition loops back to block 904. It is noted that the L2 cache partition may receive multiple request messages while busy, in which it either forwards the request message when not the target L2 cache partition or sets sends a reject message to the requesting L1 cache. It is noted that the RREQ value is set true when at least one request message is received while the target L2 cache partition is busy regardless of the number of request messages.

When the target L2 cache partition has completed its current tasks (such as sending an accept message at block 912), it sets BUSY back false (e.g., at block 916). Thus, when the target L2 cache partition is no longer busy and is able to handle requests from L1 caches, operation advances from block 904 to block 906 to again query whether RREQ is true. If at least one request message targeting the L2 cache partition was received and rejected while busy, operation instead advances instead to block 928 in which it broadcasts a retry message incorporating its own L2ID, which in this case is L2_y, in order to inform one or more requesting L1 caches that it is now available to handle requests. In addition, RREQ is set back to false since any requesting L1 caches are informed by the broadcasted retry message to resend their requests. Operation then loops back to block 904 while waiting for any request messages whether new or retried.

After broadcasting the retry message with its L2ID, the requesting L1 cache eventually receives the retry message with an L2ID that matches its locally stored L2ID as previously described for blocks 718 and 720 in FIG. 7 or blocks 818 and 820 in FIG. 8. Thus, each L1 cache that sent an initial request message that was rejected then resends its request to the target L2 cache partition with the same L2ID L2_y. In a subsequent iteration, if the target L2 cache partition is still no longer busy as determined at block 904, it sends an accept message to the requesting L1 cache as described at block 912. If multiple L1 caches resend request messages to the same L2 cache partition in response to the broadcasted retry message, then it handles the first received request message while again rejecting the other received request messages until all such request messages are processed over time.

FIG. 10 is a figurative block diagram illustrating information incorporated within a request (REQ) message 1002 from the L1 cache and a response message 1004 from a target L2 cache partition according to one embodiment. The request message 1002 includes the memory address ADDR of interest, and if known, the unique L2 identifier (L2ID) of the target L2 cache partition. The request message 1002 may also include a locality (LOC) value of the target L2 cache partition if known. The LOC value identifies the location of the target L2 cache partition relative to the requesting L1 cache, and may have values: LOCAL, INTERNAL, or EXTERNAL. LOC=LOCAL when L1 cache is directly linked to the local L2 cache partition (e.g., L2_2 for the L1 caches L1-5-L1-8) of the same core cluster, LOC=INTERNAL when the L2 cache partition is within the same meta-tile (and thus sent via corresponding local IR), and LOC=EXTERNAL when the L2 cache partition is external to the local meta-tile (and thus send via corresponding local ER). LOC may have different values for different configurations, but generally serves to reduce request traffic. The LOC value may be used to reduce traffic, for example, by reducing the number of routers and interconnects in the routing network 404 receiving and forwarding the request messages. Although ADDR is known for the initial request, the L2ID and the LOC value may not be initially known and may be known when resending the request.

The response message 1004 generally represents either a reject message sent from the target L2 cache partition directly to the requesting L1 cache, or a broadcasted retry message send from an L2 cache partition. The response message 1004 includes a CAUSE field, an ID field for storing the corresponding L2ID of the sending L2 cache partition, and an address field for storing ADDR when appropriate. In one embodiment, the L2ID value may be incorporated in a read data (Rdata) field of a retry message. The CAUSE field incorporates information regarding either the cause of the reject message (when the response message 1004 is a reject message) or a cause of the retry message (when the response message 1004 is a retry message). The CAUSE field and the corresponding response from the L1 cache are more fully described in FIG. 11.

FIG. 11 is a table 1102 listing the information stored in the CAUSE field of the response message 1004 for both reject and retry messages, and the corresponding response by the L1 cache according to one embodiment. In one embodiment, the cause of the reject/retry can be due to the following and have corresponding values: 1) coherency manager full: all outstanding coherency buffer busy; 2) coherency manager pending: coherency is in progress for requested cache line; 3) miss manager full: all outstanding miss manager buffer busy; and 4) miss manager pending: awaiting L2 miss cache line from main memory 112. Although the cause information is selected from the same information values for both reject and retry messages (Coherency Manager Full, Coherency Manager Pending, Miss Manager Full, Miss Manager Pending), the cause information of the retry message may be different from the cause information of the reject message.

The first column of the table 1102 lists the cause information for a reject message. The remaining four columns of the table 1102 lists the cause information for a retry message and the corresponding response from the L1 cache. The response from the L1 cache includes not resending the request message, resending the request message based on L2ID, and resending the request message based on L2ID and ADDR. For those cases in which the reject cause happens due to pending coherency or pending miss, the retry message has the correct ADDR and L1 waits for that address and L2ID to launch the request. In those cases when all the slots of the miss manager and the coherency manager are busy and rejection happens due to the miss manager full or coherency manager full, then the L1 cache resends the request message based on L2ID since the retry address message may not match the rejected address.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. For example, variations of positive circuitry or negative circuitry may be used in various embodiments in which the present invention is not limited to specific circuitry polarities, device types or voltage or error levels or the like. For example, circuitry states, such as circuitry low and circuitry high may be reversed depending upon whether the pin or signal is implemented in positive or negative circuitry or the like. In some cases, the circuitry state may be programmable in which the circuitry state may be reversed for a given circuitry function.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

We claim:

1. A multiple core processing system, comprising:

a plurality of first-level caches;

a second-level cache system comprising a plurality of second-level cache partitions, each associated with a corresponding one of a plurality of identifiers;

a routing network that is configured to enable communication between the plurality of first-level caches and the second-level cache system;

wherein each of the plurality of first-level caches is configured to send a request message with a memory address to the second-level cache system, and, when the request message is rejected by a targeted one of the plurality of second-level cache partitions, to resend the request message only in response to a retry message from the second level cache system that incorporates an identifier that matches a locally stored identifier associated with the targeted one of the plurality of second-level cache partitions; and wherein each of the plurality of second-level cache partitions is configured to send a reject message to each requesting first-level cache when busy and to broadcast a retry message that incorporates an associated one of the plurality of identifiers when not busy.

2. The multiple core processing system of claim 1, wherein each of the plurality of second-level cache partitions is further configured to incorporate an associated one of the plurality of identifiers within each reject message; and wherein each of the plurality of first-level caches is further configured to store an identifier incorporated within a received reject message.

3. The multiple core processing system of claim 1, wherein each of the plurality of first-level caches is further configured to determine and to locally store the identifier associated with a second-level cache partition that is a target of the request message when sending the request message.

4. The multiple core processing system of claim 1, wherein each of the plurality of first-level caches is configured to compare an identifier incorporated within a received retry message with a locally stored identifier for determining whether to resend the request message.

5. The multiple core processing system of claim 4, wherein each of the plurality of first-level caches is configured to resend the request message only when an identifier incorporated within the received retry message matches the locally stored identifier.

6. The multiple core processing system of claim 4, wherein each of the plurality of first-level caches is configured to ignore the received retry message when the identifier incorporated within the received retry message does not match the locally stored identifier.

7. The multiple core processing system 1, wherein a response message from the targeted one of the plurality of second-level cache partitions, comprising either one of the reject message and the broadcasted retry message, incorporates cause information indicating a cause of the reject message or the retry message.

8. The multiple core processing system 1, further comprising a plurality of core clusters, each comprising:

a subset of the plurality of first-level caches;

a corresponding one of the plurality of second-level cache partitions; and wherein the routing network comprises:

a local internal router coupled to each of the subset of the plurality of first-level caches and the corresponding one of the plurality of second-level cache partitions; and a local external router coupled to each of the subset of the plurality of first-level caches and the corresponding one of the plurality of second-level cache partitions.

9. The multiple core processing system 8, further comprising at least one meta-tile, each comprising:

a subset of the plurality of core clusters; and wherein the routing network comprises:

a meta-tile internal router coupled to a local internal router of each of the subset of the plurality of core clusters; and at least one meta-tile external router coupled to a local external router of at least one of the subset of the plurality of core clusters.

10. The multiple core processing system 9, wherein each request message incorporates a locality identifier comprising one of local, internal, and external, and wherein the routing network uses the locality identifier for routing the request message.

11. A method, comprising:

in a multiple core processing system, comprising:

a plurality of first-level caches;

a second-level cache system comprising a plurality of second-level cache partitions, each associated with a corresponding one of a plurality of identifiers; and a routing network that is configured to enable communication between the plurality of first-level caches and the second-level cache system;

sending, by a first-level cache, a request message to a targeted one of the second-level cache partitions;

receiving, by the first-level cache, a reject message from the targeted one of the second-level cache partitions;

storing, by the first-level cache, a corresponding identifier associated with the targeted one of the second-level cache partitions;

receiving, by the first-level cache, a retry message incorporating an identifier associated with a second-level cache partition that broadcasted the retry message;

comparing, by the first-level cache, the stored identifier with the identifier incorporated within the retry message; and resending, by the first-level cache, the request message only if the stored identifier matches the identifier incorporated within the retry message.

12. The method of claim 11, wherein the sending a request comprises incorporating, by the first-level cache, a memory address within the request message used for routing the request message to the targeted one of the second-level cache partitions.

13. The method of claim 11, further comprising:

using, by the first-level cache, a memory address to identify and to determine the corresponding identifier associated with the targeted one of the second-level cache partitions; and the storing comprising storing the determined identifier associated with the targeted one of the second-level cache partitions before receiving the retry message.

14. The method of claim 11, further comprising retrieving, by the first-level cache, the corresponding identifier associated with the targeted one of the second-level cache partitions from the reject message.

15. The method of claim 11, further comprising ignoring the retry message if the stored identifier does not match the identifier incorporated within the retry message.

16. The method of claim 11, further comprising:

by the targeted one of the second-level cache partitions:

receiving the request message from the first-level cache;

determining whether the targeted one of the second-level cache partitions is busy and unable to perform a request indicated by the request message; and sending the reject message when busy and unable to perform the request indicated by the request message.

17. The method of claim 16, further comprising incorporating, by the targeted one of the second-level cache partitions, the corresponding identifier associated with the targeted one of the second-level cache partitions into the reject message.

18. The method of claim 16, further comprising:

by the targeted one of the second-level cache partitions:

determining that the targeted one of the second-level cache partitions is no longer busy;

incorporating the corresponding identifier associated with the targeted one of the second-level cache partitions into the retry message; and broadcasting the retry message.

19. The method of claim 18, further comprising incorporating, by the targeted one of the second-level cache partitions, information regarding a cause of rejection within the reject message or a cause of a retry within the retry message.

20. The method of claim 11, further comprising:

the multiple core processing system further comprising:

at least one meta-tile and wherein each meta-tile comprises a plurality of core clusters;

wherein the plurality of first-level caches are subdivided into a plurality of subsets of first-level caches and wherein each of the plurality core clusters includes a corresponding one of the plurality of subsets of first-level caches;

wherein each of the plurality of core clusters includes a corresponding one of the plurality of second-level cache partitions; and wherein the routing network comprises a plurality of internal routers for enabling communications within each of the at least one meta-tile and at least one external router for enabling external communications;

incorporating, by the first-level cache, locality identifier comprising one of local, internal, and external; and using, by the routing network, the locality identifier for routing the request message within the multiple core processing system.

* * * * *